United States Patent

[11] 3,619,450

| [72] | Inventor | Laszlo Futo<br>Im Sommer 417, Klingnau, Switzerland |
|---|---|---|
| [21] | Appl. No. | 802,133 |
| [22] | Filed | Feb. 25, 1969 |
| [45] | Patented | Nov. 9, 1971 |
| [32] | Priority | Feb. 27, 1968 |
| [33] | | Switzerland |
| [31] | | 3023/68 |

[54] MAKING OF PRESSED BODIES
1 Claim, 1 Drawing Fig.

[52] U.S. Cl. .................................................... 264/109,
264/83, 264/102
[51] Int. Cl. ..................................................... B29j 5/00
[50] Field of Search ........................................ 264/109,
101, 102, 79, 93, 297, 83; 18/16, 17 P

[56] References Cited
UNITED STATES PATENTS

| 2,956,307 | 10/1960 | Fahrni | 264/297 |
| 2,979,775 | 4/1961 | White | 264/297 |
| 3,086,248 | 4/1963 | Culp | 264/101 |
| 2,622,276 | 12/1952 | Wilson | 264/109 |
| 2,689,975 | 9/1954 | Leng | 264/109 |

Primary Examiner—Robert F. White
Assistant Examiner—J. R. Hall
Attorney—Michael S. Striker ABSTRACT: A method of making composite pressed bodies, such as panels. Material for making a composite pressed body is introduced into a tightly closable inner space. Pressing means is provided including two pressing members located in the inner space movable toward and away from one another, for exerting pressure on the material to convert the same into a composite pressed body. Means is provided which serves for regulating at the will of an operator the ambient atmosphere prevailing in the inner space.

PATENTED NOV 9 1971
3,619,450
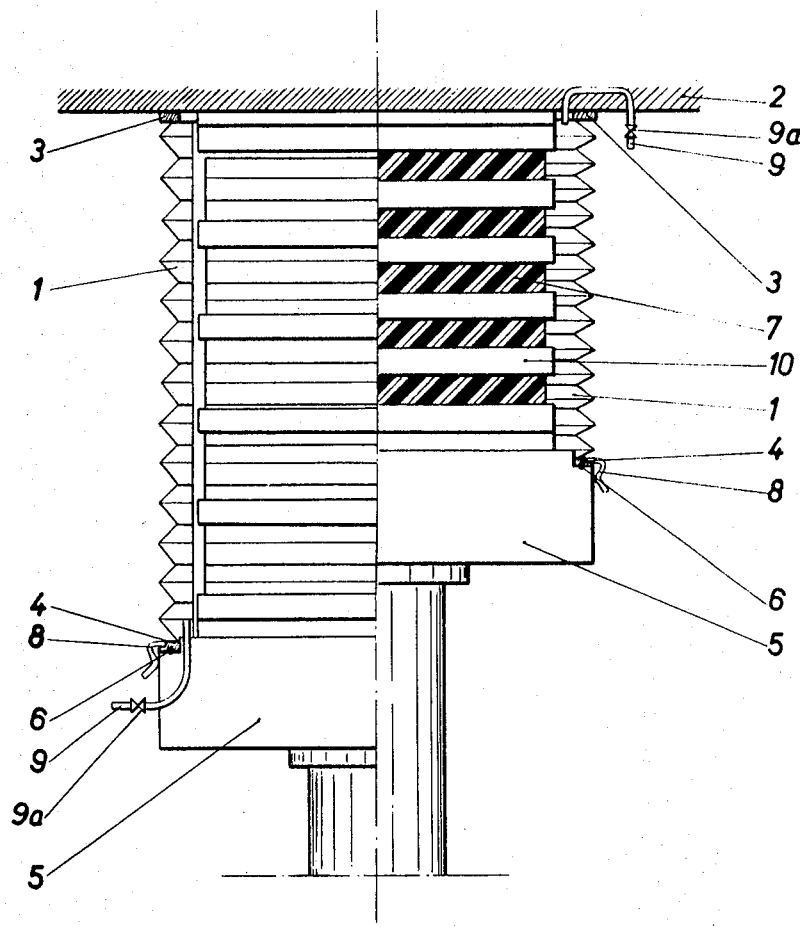
INVENTOR:
LASZLO FUTO
By: Michael J. Striker
Attorney

MAKING OF PRESSED BODIES

BACKGROUND OF THE INVENTION

The present invention relates generally to the making of composite pressed bodies, and more particularly to a method of making composite pressed bodies of wood and/or other materials.

It is known to make composite pressed bodies of many different forms, such as pressboard panels, beaverboard panels, plywood panels, or the like. Many materials are suitable for this purpose, including layers of wood, layers of mineral materials, layers of synthetic plastic materials, granules, flakes, chips or the like, of wood, minerals, synthetic plastic and other materials. Minerals, which may be used—just as is also true of synthetic plastic materials—in conjunction with wood or by themselves, or also in conjunction with other materials, are asbestos, cement, glass fibers, and woodlike materials may be flax, straw, reeds or the like.

In the known approaches to making of such pressed bodies the space in which the actual pressing is effected is open to the ambient atmosphere. Thus, at least the edges or side faces of the bodies are exposed to the ambient atmosphere, whereas other faces—in the case of panels the major surfaces—are not so exposed because during pressing they are in contact with the pressing instrumentalities. It has been found, however, that volatile materials contained in the material mixture which is being converted into a pressed body can escape at the edges or exposed side faces during the pressing stage in form of steam or in gaseous form. This is undesirable because such volatile ingredients may be either totally or partially useful for the binding process taking place during or immediately after the pressing operation.

Furthermore, the exposure of the side faces of the pressed body to the ambient atmosphere results in undesired cooling of at least portions of the pressed body and leads to the development of the so-called "border effect" which is well known to those skilled in the art and which increases in seriousness as the thickness of the pressed body increases. The result is a decrease in the quality of the finished pressed body because its strength, thickness and moisture content changes from the center of the body towards the side faces, leading to undesired additional stresses in the pressed body which hereafter shall be assumed to be of panel shape.

SUMMARY OF THE INVENTION

It is, accordingly, an object of the present invention to overcome these disadvantages.

More particularly it is an object of the present invention to provide a method of making a pressed body which avoids the aforementioned disadvantages.

A concomitant object of the invention is to provide such a method which assures that the final pressed body is a substantially identical composition and has substantially identical characteristics over its entire cross section at any given location.

In pursuance of the above objects, and others which will become apparent hereafter, one feature of my invention resides in a method of making composite pressed bodies according to which I confine a quantity of material requisite for making a composite pressed body, between two pressure-exerting instrumentalities. I thereupon exert on this quantity of material a pressure of a magnitude which is requisite for transforming the material into a composite pressed body. While the quantity of material undergoes this pressing operation, I surround it with an ambient atmosphere which is controllable at the will of an operator so that its chemical or physical characteristics may be changed or maintained uniform, as desired.

Resort to my novel invention makes it possible to control the circumstances surrounding the pressing operation at will, by either changing the ambient atmosphere or maintaining it constant. It is immaterial for purposes of my invention whether the pressing instrumentality is of the type manufacturing a single or several pressed bodies simultaneously, whether it makes flat panels or shaped bodies, or whether it utilizes hot pressing or cold pressing. I am able to vary the ambient atmosphere surrounding the material being transformed into a pressed body by changing the air pressure and partial vapor pressure through the introduction of gases, steam or liquids into the ambient atmosphere, or reducing these factors by the application of vacuum, and I can accomplish this during the actual pressing operation itself, or I can additionally carry out these controls preliminary to and/or subsequent to the actual pressing operation.

It will be appreciated that under these circumstances any gases which escape from the material being subjected to pressure, such as formaldehyde, water vapor or the like, or air which has been heated prior to or during the pressing operation, cannot escape from the vicinity of the pressing instrumentality and of the material being compressed into a pressed body. Accordingly, I can assure with my invention that the partial pressure of these materials and the temperature in the entire body of material being subjected to pressure as well as in the ambient atmosphere is at least substantially uniform throughout the entire space in which the pressure operation is carried out. Gases which have escaped from the material and are necessary for chemical reactions are retained in the ambient atmosphere and therefore available for their intended function.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE illustrates diagrammatically in a partly sectioned elevational view an embodiment of an apparatus for carrying out my novel method.

DESCRIPTION OF THE PREFERRED EMBODIMENT

Discussing now the FIGURE in detail it will be seen that I have illustrated by way of example a multistage press. I wish it understood, however, that this is indeed only by way of example and that single-stage presses and in fact any other type of press conventionally used for making pressed bodies, could similarly be employed according to my invention.

I provide in the illustrated embodiment a gastight envelope bellows 1 here consisting of Teflon sheet material and reinforced in suitable manner, for instance with metal fabric or with asbestos fabric. One end of the tubular bellows 1 is gastightly mounted by means of a metal ring 3 to the member 2.

The opposite axial end of the bellows 1 is provided with a metal ring 4 which is secured to the bellows 1 and movable therewith when the same is axially extended and compressed. This metal ring 4 is releasably secured to the pressing instrumentality 5 in suitable manner, and I have chosen to illustrate this securing by means of clamping levers 8 of known construction. A sealing ring 6 is interposed between the metal ring 4 and the pressing instrumentality 5 to assure a gastight connection between the two.

I should point out that in the left-hand side of the FIGURE I have illustrated the bellows extended, that is I have illustrated the press in a condition where no pressing operation takes place, whereas at the right-hand side I have shown the press in its operative position in which material between the individual stages is being compressed into pressed bodies.

The clamping levers 8 are normally of the hand-operated type requiring the services of an operator. However, I have already indicated that other connecting means are possible and among these I wish to emphasize the possibility of automatic or semiautomatic connecting devices which may be of known construction and can replace the clamping levers 8.

The bellows 1, in conjunction with the facing surfaces of the pressing members 2 and 5, surrounds an enclosed inner space into which the material to be pressed, identified with reference numeral 7, is introduced. Because I have chosen to illustrate the invention by means of a multistage press, several quantities of the material 7 are introduced into the interior of the enclosed space and these quantities are separated by the pressure plates 10 from one another.

In accordance with my invention I provide conduits in the members 2 and 5, which conduits communicate with the enclosed space as illustrated. The conduits are identified with reference numeral 9 and provided with valves 9a so that, in dependence upon whether or not the valves 9a are opened or closed in the various conduits, I may control the ambient atmosphere in the enclosed space at the will of an operator. Parenthetically, it should be pointed out that if it is desired or necessary, heating or cooling elements may be provided, for instance in the members 2, 5 and/or 10. These are well known and are not illustrated.

In operation of the illustrated apparatus, more particularly for introducing or removing the material to be compressed with the finished pressed bodies, the ring 4 is released from the member 5 and the bellows 1 axially compress against the underside of the member 2. This exposes the space between the members 2 and 5 for introduction of material to be compressed, or for the removal of pressed bodies. After the introduction of material to be compressed has been completed, the bellows is extended until the ring 4 abuts against the sealing ring 6 and can be secured to the member 5 by means of the clamping lever 8. Now, the member 5 is moved towards the member 2 until the desired conversion of the material 7 into pressed bodies is achieved in known manner.

During this pressing operation I may maintain the ambient atmosphere in the enclosed space, enclosed by the bellows 1 and the juxtaposed faces of the members 2 and 5, constant, in which case I merely need close all the valves 9a to prevent escape of the ambient atmosphere from the interior of the enclosed space. Alternately, I may change either the chemical or physical parameters of the ambient atmosphere, for instance by introducing gases, vapors or liquids through one or more of the conduits 9 of which there are only two shown but of which there evidently may be any desired number provided. On the other hand I may simply let some of the ambient atmosphere escape if this serves the desired purpose, or I may apply vacuum through one or more of the conduits 9. It will be appreciated that the various sources of vacuum or fluids have not been illustrated because they do not in themselves form a part of my invention.

Where the possibility exists that the bellows might be radially expanded, I may provide guide rods extending intermediate the members 2 and 5 at the exterior of the bellows 1, or other suitable guide means which is capable of preventing such radial expansion.

Of course, it is not necessary that the opposite ends of the bellows 1 are connected directly to the members 2 and 5. They could be respectively permanently and releasably connected to juxtaposed surfaces of two adjacent ones of the pressure plates 10. Similarly, the members 2 and 5 as well as the bellows 1 may be surrounded with a rigid housing and measuring and/or registering devices may be located within the housing, without the housing or both within or without the housing.

Finally, it should be understood that instead of connecting the bellows with the members 2 and 5, or with two adjacent ones of the members 10, the bellows may be constructed as a gastight envelope containing the material to be converted into a pressed body, with the pressure instrumentalities acting against the exterior of the gastight envelope. Of course, the conduit means 9 must then in suitable manner communicate with the interior of this envelope.

It will be understood that each of the elements described above, or two or more together, may also find a useful application in other types of constructions differing from the types described above.

While the invention has been illustrated and described as embodied in the manufacture of pressed bodies, it is not intended to be limited to the details shown, since various modifications and structural changes may be made without departing in any way from the spirit of the present invention. The pressing faces may also be arranged in an enveloping housing composed of rigid walls, access to the interior thereof being afforded through a tightly sealable door, through which the material to be pressed is inserted and withdrawn. Measuring and/or recording means (not shown) may be arranged inside or outside the said housing.

What is claimed as new and desired to be protected by Letters Patent is set forth in the appended claim.

1. A method of making pressed bodies from a composite material having gas therein, comprising the steps of placing between facing surfaces of pressing members a quantity of said composite material for making a pressed body, said pressing member surfaces and said composite material being surrounded by an ambient atmosphere within a space enclosed by a gastight envelope; pressing said composite material between said pressing member surfaces to transform said material into a pressed body; and controlling the physical or chemical characteristics of the ambient atmosphere within said gastight envelope while retaining within said ambient atmosphere the gases escaping from said composite material during pressing of said composite material between said pressing member surfaces.

* * * * *